(12) United States Patent
Ko et al.

(10) Patent No.: US 8,040,610 B2
(45) Date of Patent: Oct. 18, 2011

(54) LIGHT GUIDING FILM

(75) Inventors: Chun-Yu Ko, Kaohsiung (TW);
Chien-Liang Lu, Tainan (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 0 days.

(21) Appl. No.: 12/849,215

(22) Filed: Aug. 3, 2010

(65) Prior Publication Data

US 2011/0043919 A1   Feb. 24, 2011

(30) Foreign Application Priority Data

Aug. 18, 2009   (TW) ................................ 98127689 A

(51) Int. Cl.
*G02B 17/00* (2006.01)
*G02B 27/00* (2006.01)
(52) U.S. Cl. ........................ 359/592; 359/598
(58) Field of Classification Search .................. 359/592, 359/595, 596–598
See application file for complete search history.

(56) References Cited

U.S. PATENT DOCUMENTS

| | | | | |
|---|---|---|---|---|
| 4,509,825 A * | 4/1985 | Otto et al. | ...................... | 359/592 |
| 4,773,733 A * | 9/1988 | Murphy et al. | ............... | 359/593 |
| 7,538,943 B2 * | 5/2009 | Shinbo | .......................... | 359/460 |
| 7,872,801 B2 * | 1/2011 | Kojima et al. | ................ | 359/460 |
| 2009/0009870 A1 * | 1/2009 | Usami | .......................... | 359/592 |

* cited by examiner

*Primary Examiner* — Christopher Mahoney
(74) *Attorney, Agent, or Firm* — Rosenberg, Klein & Lee

(57) ABSTRACT

A light guiding film has a film body and a micro-structured portion. The film body has a first side, a second side and a reference horizontal level vertical to the second side. The micro-structured portion is set on the second side and has a plurality of V-shaped grooves, and each one of the V-shaped grooves has a first sub-face and a second sub-face. The first sub-face has a first included angle between 16° and 22° with respect to said reference horizontal level, and the second sub-face has a second included angle between 8° and 17° with respect to said reference horizontal level. When an incident light beam injects downwardly on said micro-structured portion in a predetermined incident angle range, a predetermined percentage of said incident light beam emit an emissive light beam projected out in an included angle range between 0° and 90° with respect to said reference horizontal level.

28 Claims, 23 Drawing Sheets

LIGHT GUIDING FILM

BACKGROUND OF THE INVENTION (1) Field of the Invention

The present invention relates to a light guiding film, more particularly to a light guiding film applied to guide sunlight indoors for energy saving.

(2) Description of the Prior Art

Conventionally, most of the sunlight guiding devices are provided in various types, such like the board type, the blind type or the film type, and further applied to guide sunlight into a house. Preferably, it is more helpful to provide better indoor illumination by guiding said sunlight to a light distribution device set on the ceiling of the house to make said sunlight distributed over the house.

Generally, the sunlight guiding devices could reflect or refract both directive rays and diffusive rays of sunlight, guide them to project to aforesaid light distribution device, and further make them distributed over the house. Then, a comfortable visual surrounding is presented due to that the uniformity of illumination is increased, and the flare effect is reduced. Moreover, via efficiently taking advantage of sunlight resource, the sunlight guiding devices not only could save energy but also make themselves become one of the most popular kinds of green architectural material.

Under the background as mentioned, a light guiding film improved to be more efficiently is provided in present invention.

SUMMARY OF THE INVENTION

The primary object of the present invention is to provide a light guiding film, which can guide natural sunlight turn its projection directions for intensifying indoors illumination by increasing the amount of light rays.

The present invention is a light guiding film comprises a film body and a micro-structured portion, which are capable of integrally formed with each other. The film body comprises a first side and a second side. The micro-structured portion is set on the second side and has a plurality of V-shaped grooves, and each one of the V-shaped groove has a first face and a second face.

A reference horizontal level is defined to be vertical to the second side. The first face and the second face respectively have a first included angle and a second included angle with respect to the reference horizontal level, and the first included angle is between 16° and 22° as well as the second included angle is between 8° and 17°.

As well, the light guiding film is made of a material with the refractive index ranging from 1.35 to 1.65, and with a light transmittance ranging from 0.75 to 0.95.

In this situation, when an incident light beam injects downwardly on the micro-structured portion in a predetermined incident angle range between 30° and 60° with respect to the micro-structured portion, a predetermined percentage or more of the incident light beam would be transmitted through the micro-structured portion and projected out of the first side to emit an emissive light beam. The emissive light beam is upwardly projected in an included angle range between 0° and 90° with respect to the reference horizontal level.

In one preferred embodiment, the first included angle is 18°, and the second included angle is 15°. Thus, for each one of the V-shaped grooves, no matter the first included angle is under or above the second included angle, the predetermined percentage would be 80% or more. It implies that 80% or more of the incident light beam is transmitted through the light guiding film and projected out to emit a emissive light beam after the incident light beam injects to the light guiding film.

In another preferred embodiment, when the incident light beam injects to the first side of the light guiding film, the first included angle is 18°, the second included angle is 15°, for each one of the V-shaped grooves, no matter the first included angle is under or above the second included angle, the predetermined percentage is 50% or more.

In another preferred embodiment, a fillet is formed between the first face and the second face. Thus, the first face further includes a first sub-face and a second sub-face. The second sub-face seated between the first sub-face and the second face, has a third included angle between 140° and 150° with respect to the first sub-face, and has a fourth included angle between 60° and 70° with respect to the second face. The third included angle is greater than the fourth included angle. Preferably, the predetermined percentage is 70% or more when the first included angle is 20°, the second included angle is 10° in this embodiment; the third included angle is 145°, the fourth included angle is 65°, the first included angle is above the second included angle, and the third included angle is under the fourth included angle.

In another preferred embodiment, preferably, the predetermined percentage is 50% or more when the first included angle is 20°, the second included angle is 10°, the third included angle is 145°, the fourth included angle is 65°, the first included angle is under the second included angle, and the third included angle is above the fourth included angle.

In another preferred embodiment, the predetermined amount is 60% when the incident light beam injects to the first side of the light guiding film, the first included angle is 20°, the second included angle is 10° in this embodiment, the third included angle is 145°, the fourth included angle is 65°, the first included angle is under the second included angle, and the third included angle is above the fourth included angle.

In another preferred embodiment, the light guiding film further comprises a first protecting film and a second protecting film, which are respectively mounted on the first side and the second side.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
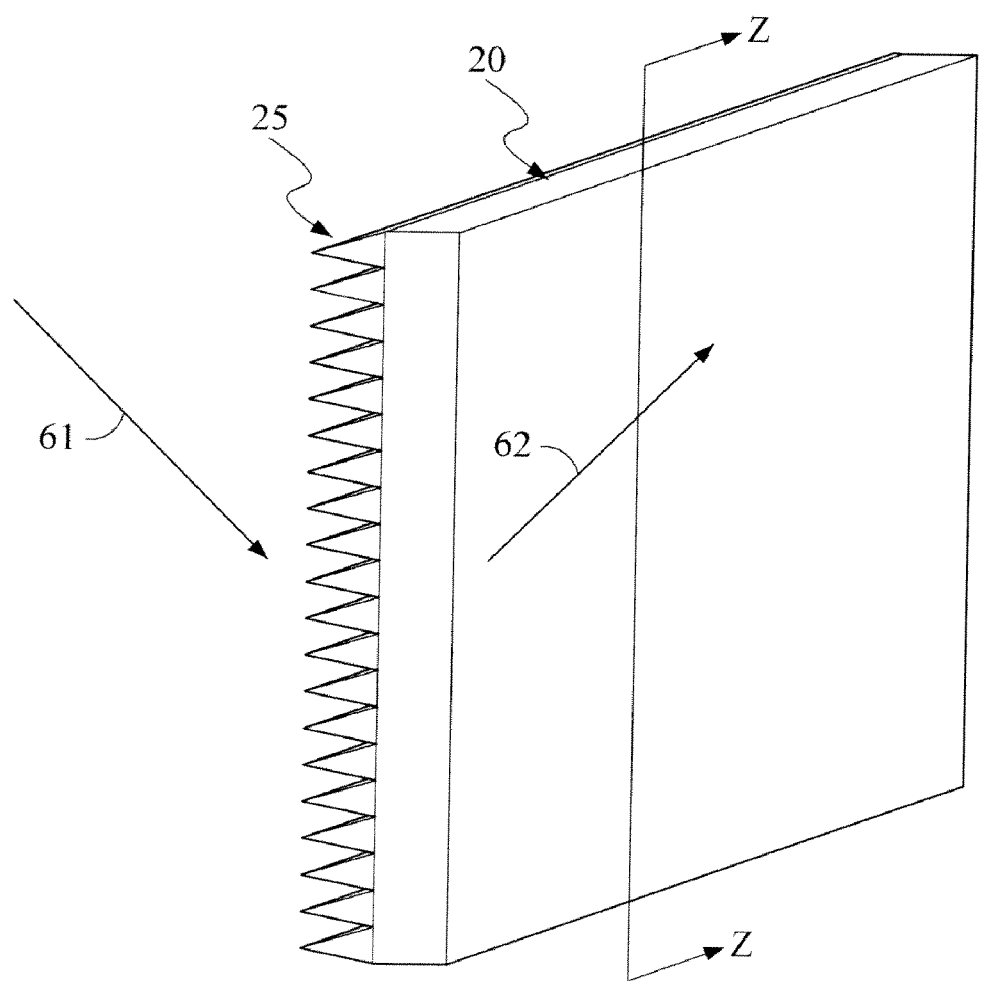
FIG. 1 is a perspective view of light guiding film.

Referring to FIG. 1, which shows a perspective view of light guiding film in accordance with the present invention. A light guiding film 20 is provided with a micro-structured portion 25 being capable of efficiently guiding light beams turn their directions. Preferably speaking, the light guiding film 20 guides an incident light beam 61 downwardly projected to the micro-structured portion 25, transmitted there through to emit an emissive light beam 62 upwardly projected out.

Figure 2A:
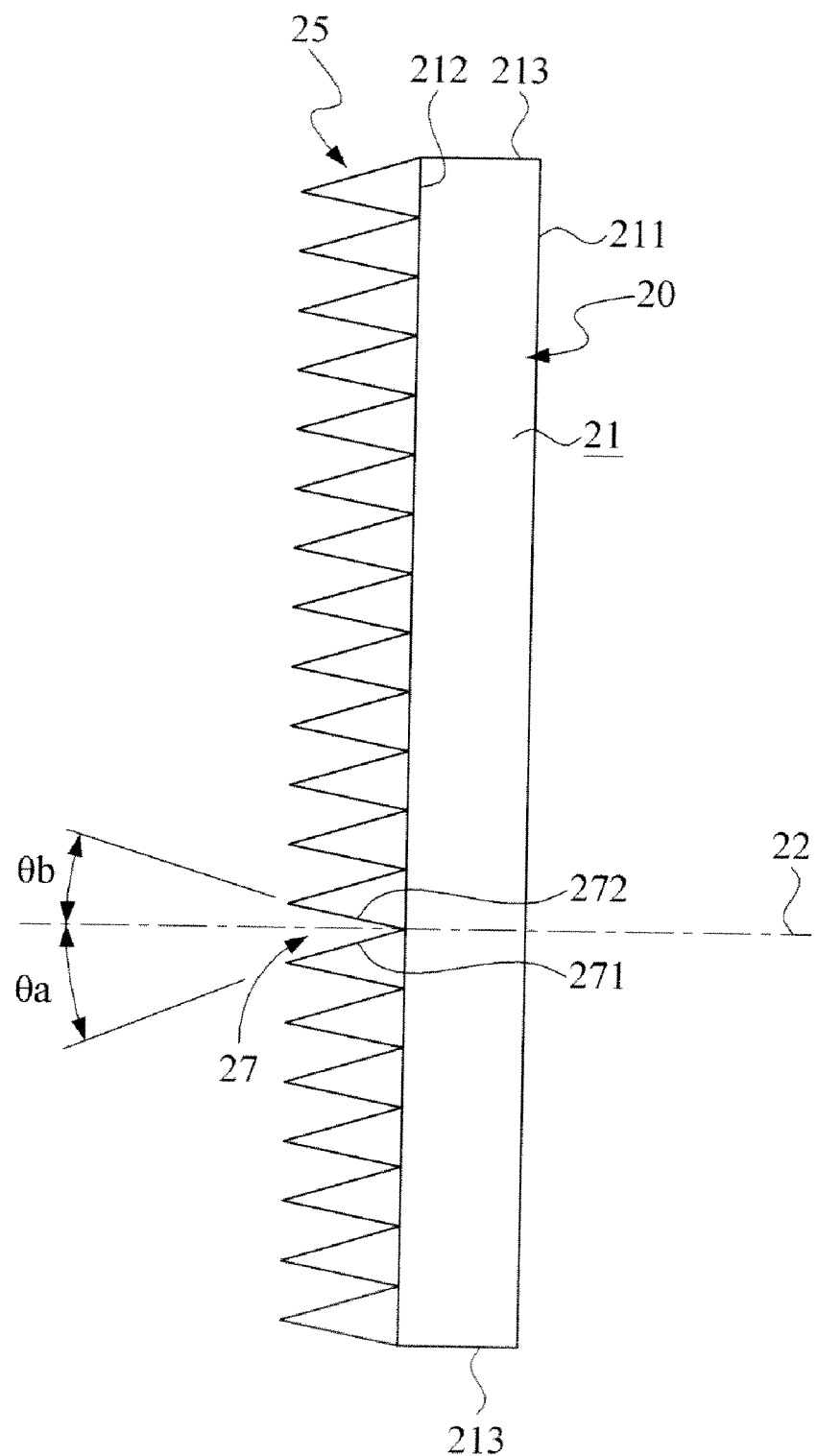
FIG. 2A is a cross-section along axis Z-Z of FIG. 1.
Figure 2B:
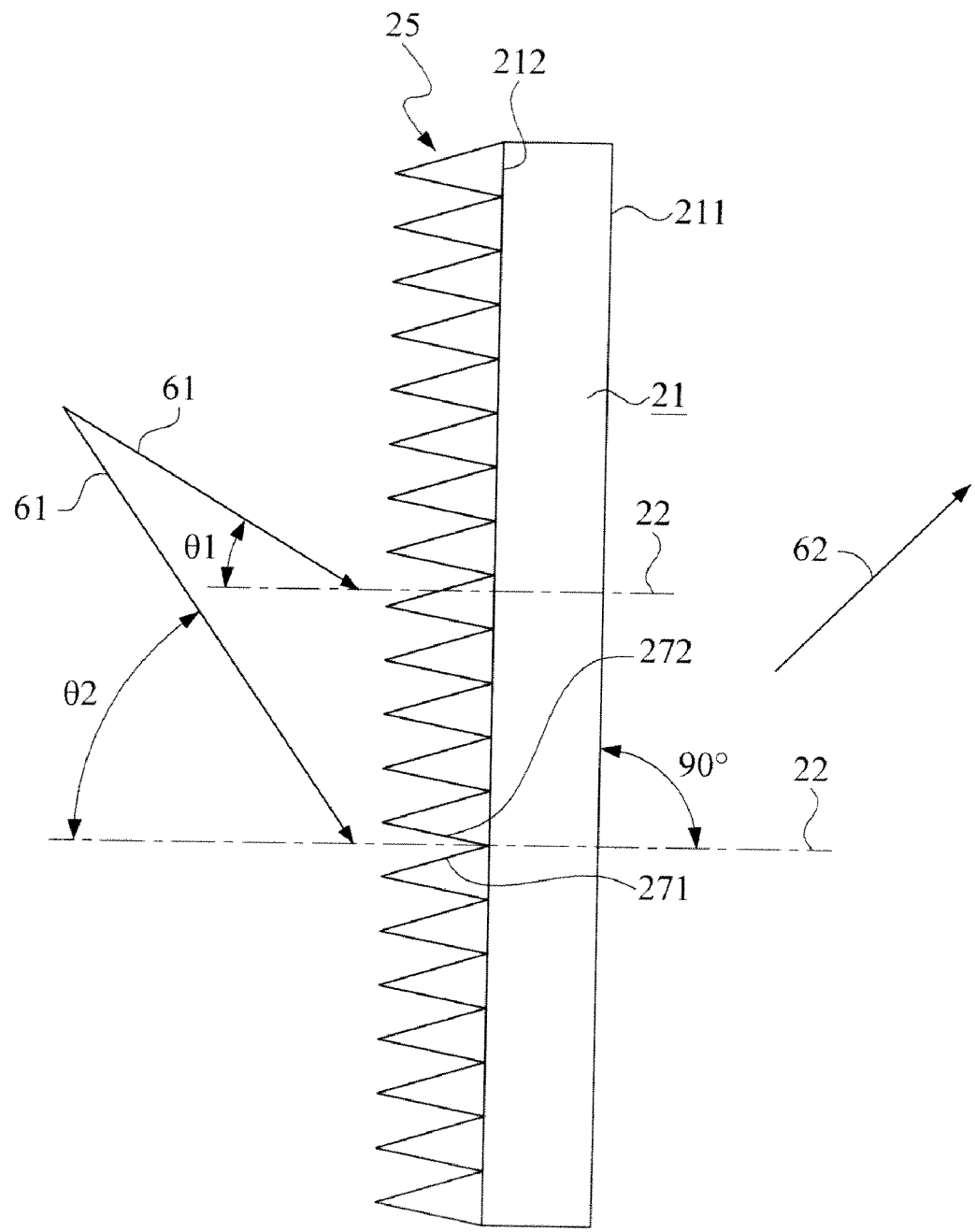
FIG. 2B shows the angle range of incident light beam and emissive light beam.

For further introducing light guiding film 20 in detail, please refer to FIG. 2A and FIG. 2B. FIG. 2A shows a cross section along axis Z-Z in FIG. 1, and FIG. 2B shows the angle range of incident light beam and emissive light beam.

As shown in FIG. 2A, the light guiding film 20 includes a film body 21 and a micro-structured portion 25. The film body 21 includes a first side 211, a second side 212 and two end portions 213 between the first side 211 and the second side 212. A reference horizontal level 22 is vertical to the second side 212. In this preferred embodiment, the first side 211 is a light-emissive side, and the second side 212 is a light-incident side.

The micro-structured portion 25 is set on the second side 212 of the film body 21, and has a plurality of V-shaped grooves 27. Each one of the V-shaped grooves 27 has a first face 271 and a second face 272. The first face 271 is lower the second face 272, and the first face 271 and the second face 272 respectively have a first included angle θa and a second included angle θb with respect to the reference horizontal level 22. The first included angle θa is between 16° and 22°, and the second included angle θb is between 8° and 17°.

As shown in FIGS. 2A and 2B, when the incident light beam injects downwardly on the micro-structured portion 25 in a predetermined incident angle range θ1 and θ2, most of the incident light beam 61 is transmitted through the first face 271, and reflected by the second face 272, so as to emit an emissive light beam 62 upwardly projected out of the light guiding film 20. Meanwhile, the emissive light beam 62 has an included angle between 0° and 90° with respect to the reference horizontal level 22.

Moreover, when the predetermined incident angle range θ1 and θ2 is between 30° and 60°, a predetermined percentage of aforesaid incident light beam 61 is transmitted through the micro-structured portion 25 and the first side 211 of the light guiding film 20 to emit aforesaid emissive light beam 62. In addition, the emissive light beam 62 has an included angle range between 0° and 90° with respect to the reference horizontal level 22.

In the preferred embodiment shown in FIG. 2A and FIG. 2B, preferably, the first included angle θa is 18° and the second included angle θb is 15°. Under these conditions, 80% or more of aforesaid incident light beam 61 is transmitted through the micro-structured portion 25 and the first side 211 of the light guiding film 20 to emit aforesaid emissive light beam 62.

Figure 2C:
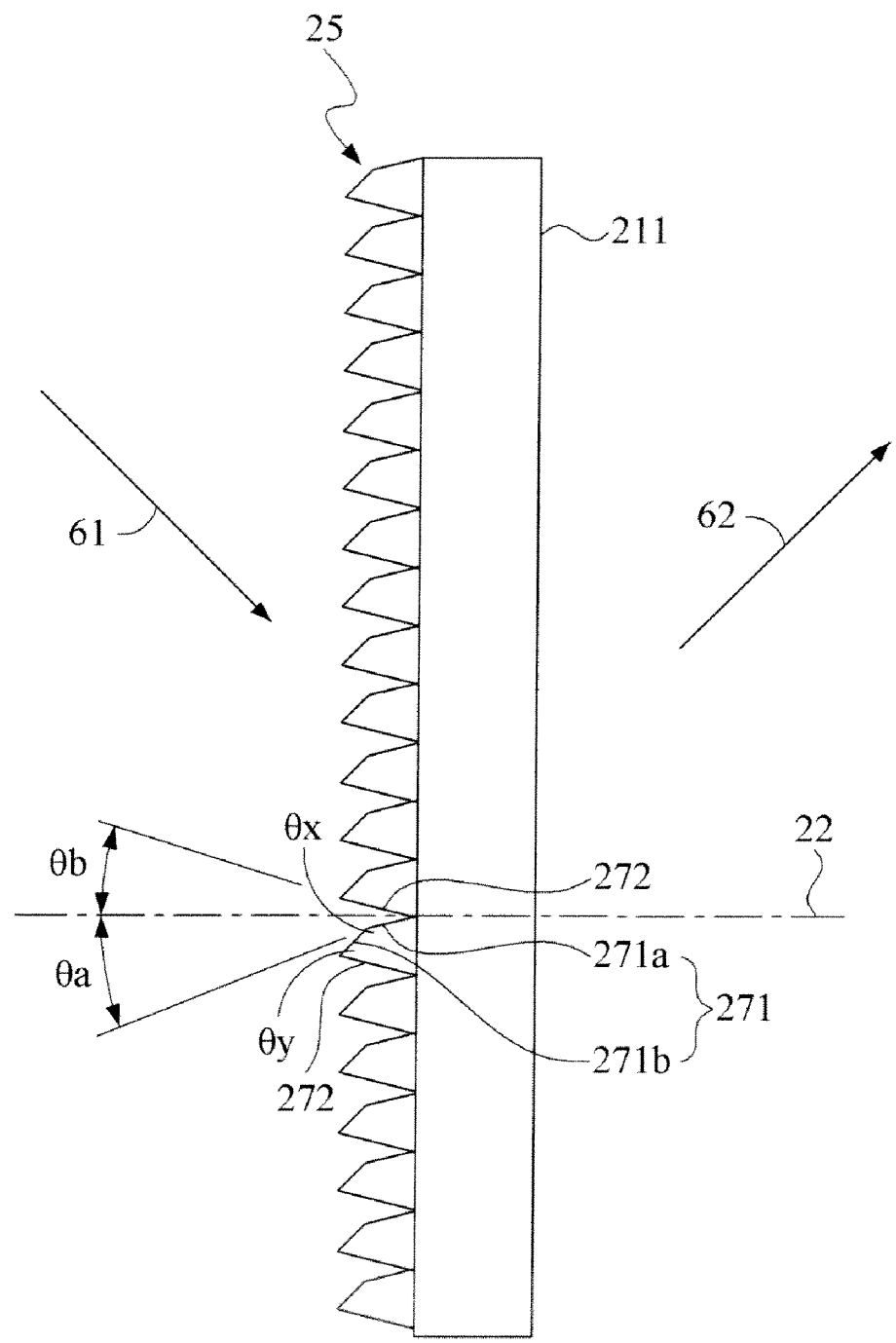
FIG. 2C shows another modification of the light guiding film shown in FIG. 2A.

Besides, in another embodiment, the first face 271 of V-shaped groove 27 could further includes two sub-grooves. As shown in FIG. 2C, the first face 271 includes a first sub-face 271a and a second sub-face 271b. The second sub-face 271b is seated between the first sub-face 271a and the second face 272. The second sub-face 271b has a third included angle θx between 140° and 150° with respect to the first sub-face 271a, and has a fourth included angle θy between 60° and 70° with respect to the second face 272.

In the embodiment shown in FIG. 2C, preferably, the first included angle θa is 20°; the second included angle θb is 10°; the third included angle θx is 145°; and the fourth included angle θy is 65°. Under such conditions, 70% or more of aforesaid incident light beam 61 is transmitted through the micro-structured portion 25 and the first side 211 of the light guiding film 20 to emit aforesaid emissive light beam 62.

Figure 2D:
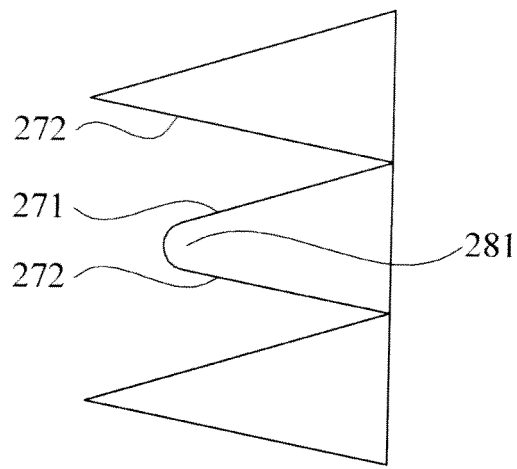
FIGS. 2D to 2G show that the fillets can be formed in some parts of V-shaped grooves.
Figure 2E:
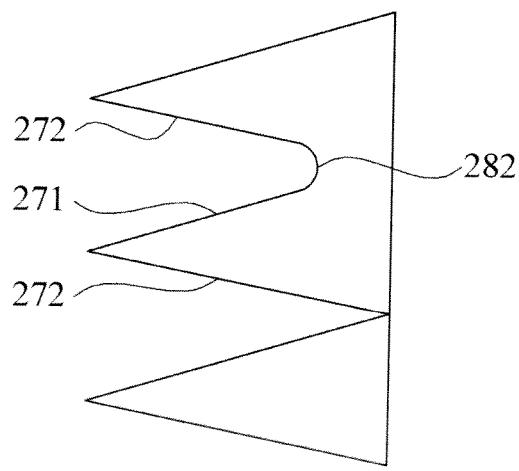
Figure 2F:
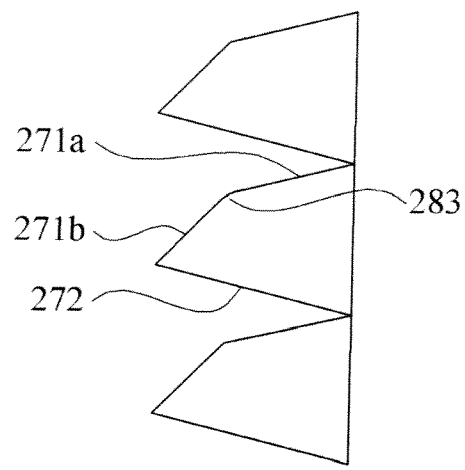
Figure 2G:
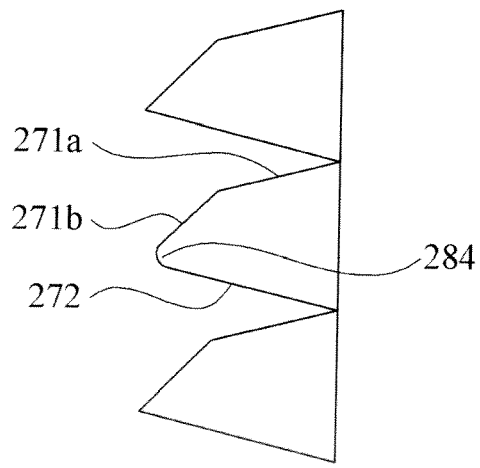

Following up, please refer to FIG. 2D and FIG. 2G which show the fillets of V-shaped groove. As shown in FIG. 2D, a fillet 281 is formed between the first face 271 and the second face 272, and the fillet 281 is a rounded fillet. As shown in FIG. 2E, a fillet 282 is formed between the first face 271 and the second face 272, and the fillet 282 is a curve-recessed fillet. As shown in FIG. 2F, a fillet 283 is formed between the first sub-face 271a and the second sub-face 271b, and the fillet 283 is a curve-protruded fillet. As shown in FIG. 2G, a fillet 284 is formed between the second sub-face 271b and the second face 272, and the fillet 284 is a rounded fillet. Additionally speaking, all of aforesaid fillets can be formed in protruded rounded, recessed rounded, linear, regular curved or irregular curved shapes.

Generally speaking, the light guiding film 20 can be manufactured by two methods. The first method is to make the film body 21 and the micro-structured portion 25 formed in an integral part. The second method is to form the film body 21 first, and then form the micro-structured portion 25 on the film body 21. The method for manufacturing the light guiding film 20 can be carried out via the manufacturing process of ultra-violet (UV) curing, Micro Electro-Mechanical System (MEMS) working, hot press, continual roller-pressing, or an injection molding . . . etc.

The light guiding film 20 is made of light transmissible material. Said light transmissible material can be polymer, such like PMMA, PET, PE, PC . . . etc. Meanwhile, the light guiding film is made of a material with the refractive index ranging from 1.35 to 1.65, and with a light transmittance ranging from 0.75 to 0.95.

It is necessary to emphasize that for the efficiency of light-guiding, the influence in the dimensions of the micro-structured portion 25 is much less than the influence in the related angles as mentioned above. Therefore, the design of the related angles as mentioned above is more important than the design of dimensions.

It is more important to emphasize that the design of the related angles of the micro-structured portion 25 is applied to promote the efficiency of light guiding. The manufacturing methods, the kinds of material and the shapes of the fillets are not limited to those as mentioned above.

Figure 3A:
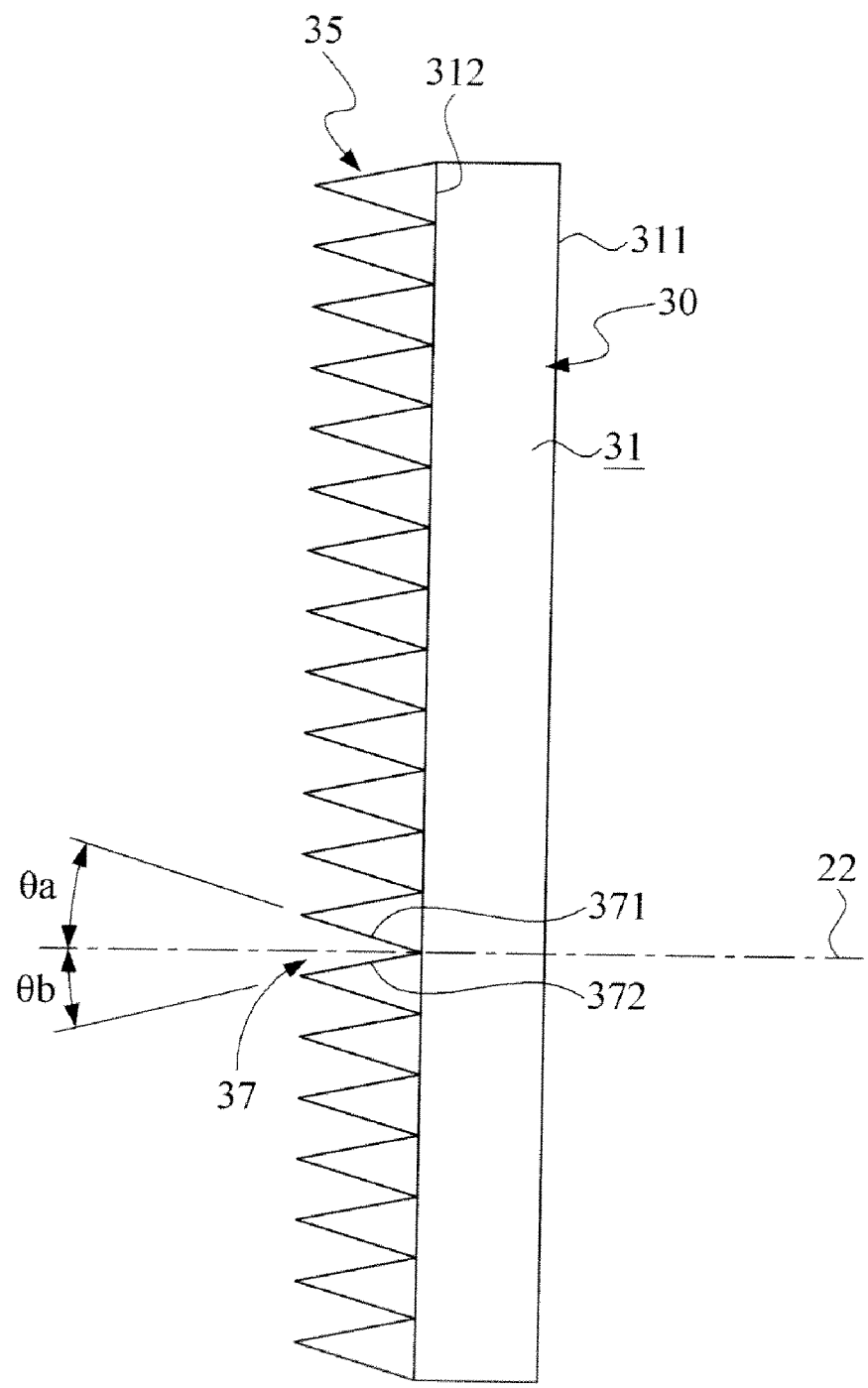
FIG. 3A shows a cross section of the another embodiment of the light guiding film.
Figure 3B:
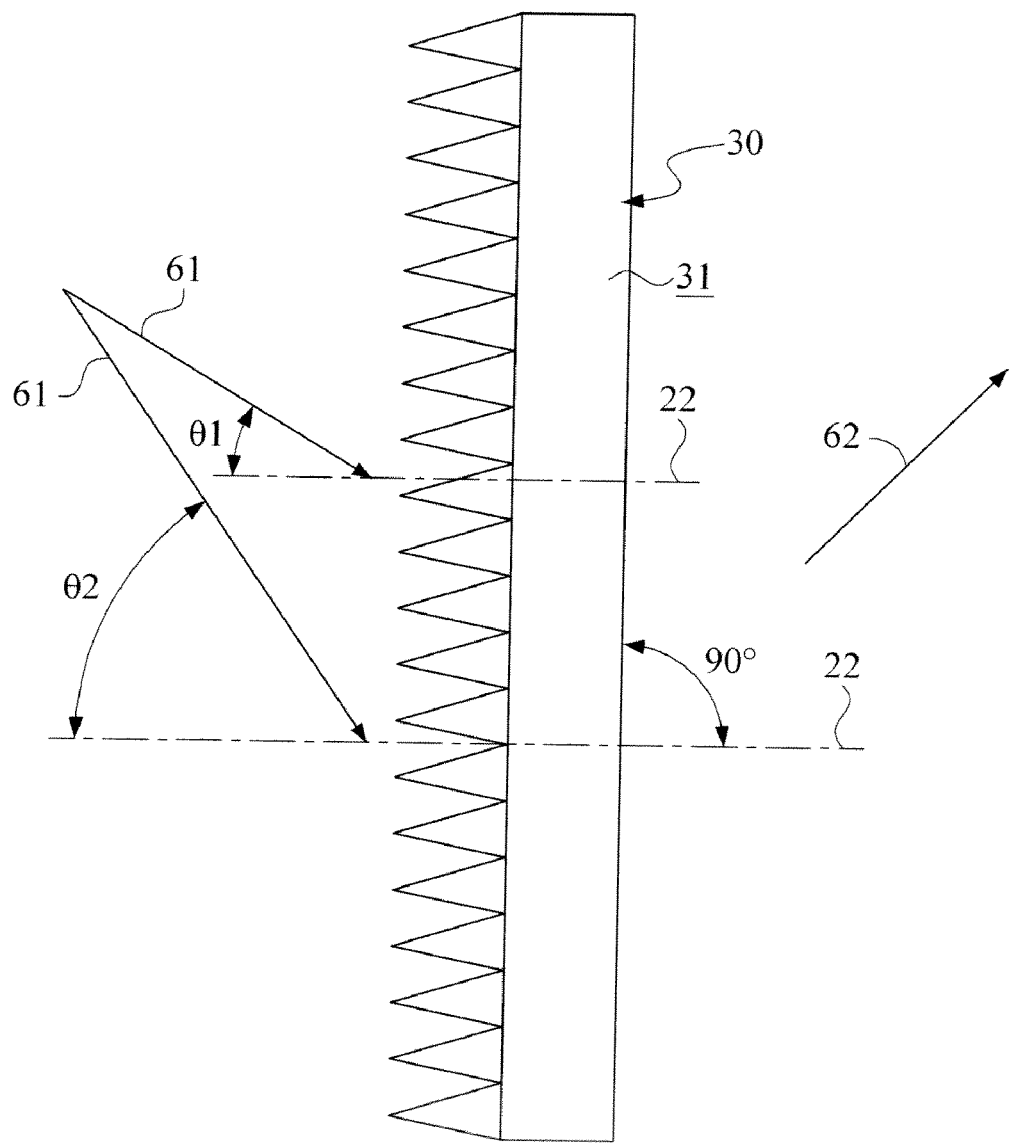
FIG. 3B shows the angle range of incident light beam and emissive light beam which respectively project in and out of the light guiding film.

For introducing another modification of the light guiding film in accordance with the present invention, please refer to FIG. 3A and FIG. 3B. FIG. 3A shows a cross section of another embodiment of the light guiding film 30, and FIG. 3B shows the angle range of incident light beam and emissive light beam which respectively project in and out of the light guiding film 30. The light guiding film 30 shown in FIG. 3A and FIG. 3B is similar to the light guiding film 20 shown in FIG. 2A and FIG. 2B in many terms of structure, function, forming, material . . . etc., so only the main difference between them would be described as follows.

As shown in FIG. 3A, the micro-structured portion 35 of the light guiding film 30 has a plurality of V-shaped grooves 37. The light guiding film 30 shown in FIG. 3 is similar to the light guiding film 20 shown in FIG. 2A and FIG. 2B in many terms of structure, function, forming, material . . . etc., so only the main differences between them would be described bellow. Each one of the V-shaped grooves 37 has a first face 371 and a second face 372. For each one of the V-shaped grooves 37, the first face 371 is located above the second face 372. Meanwhile, the first face 371 and the second face 372 respectively have a first included angle θa and a second included angle θb with respect to the reference horizontal is level 22, wherein the first included angle θa is between 16° and 22°, and the second included angle θb is between 8° and 17°.

As shown in FIG. 3B, when the incident light beam 61 injects downwardly on the micro-structured portion 35 in a predetermined incident angle range θ1 and θ2, and the micro-structured portion 35 is set on the second side 312 of the light guiding film 30, most of the incident light beam 61 is transmitted through the second face 372, reflected by the first face 371, and transmitted through the first side 311 of the light guiding film 30 to emit the emissive light beam 62 upwardly projected out of the light guiding film 30. Meanwhile, the emissive light beam 62 has an included angle between 0° and 90° with respect to the reference horizontal level 22.

In the embodiment shown in FIG. 3A and FIG. 3B, preferably, the first included angle θa is 18° and the second included angle θb is 15. Thus, 80% or more of aforesaid incident light beam 61 is transmitted through the micro-structured portion 35 and the first side 311 to emit aforesaid emissive light beam 62 with an included angle between 0° and 90° with respect to the reference horizontal level 22.

Figure 3C:
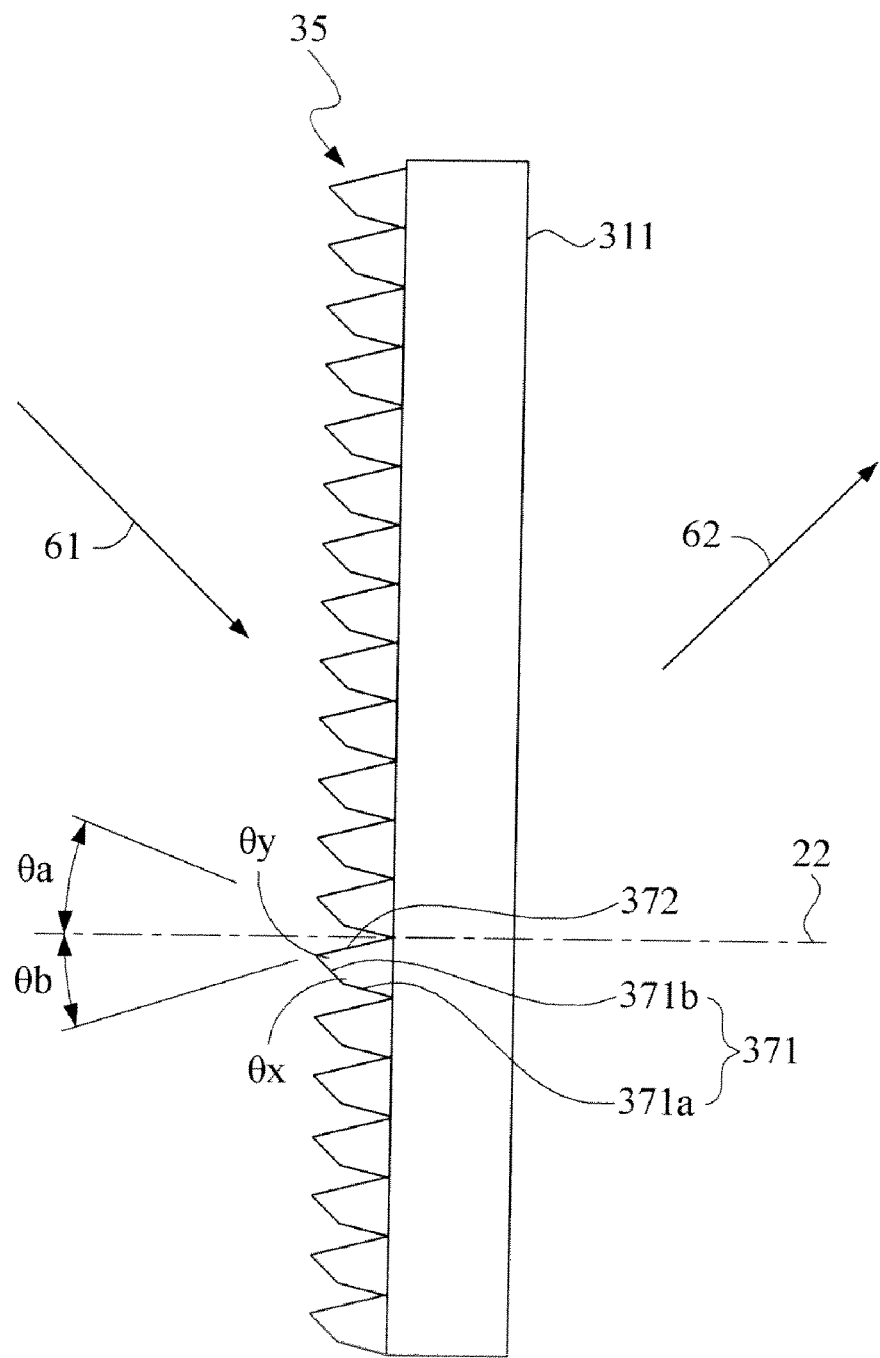
FIG. 3C shows another modification of the light guiding film.

Additionally, the V-shaped grooves 37 of the light guiding film 30 as shown in FIG. 3A could further includes two sub-grooves. As shown in FIG. 3C, the first face 371 includes a first sub-face 371a and a second sub-face 371b. The second sub-face 371b is seated between the first sub-face 371a and the second face 372. The second sub-face 371b has a third included angle θx with respect to the first sub-face 371a between 140° and 150°, and further has a fourth included angle θy with respect to the second face 372 between 60° and 70°.

In the embodiment shown in FIG. 3C, preferably, the first included angle θa is 20°; the second included angle θb is 10°; the third included angle θx is 145°; and the fourth included angle θy is 65°. Under these conditions, 50% or more of aforesaid incident light beam 61 is transmitted through the micro-structured portion 35 and the first side 311 to emit aforesaid emissive light beam 62 with an included angle between 0° and 90° with respect to the reference horizontal level 22.

Figure 4A:
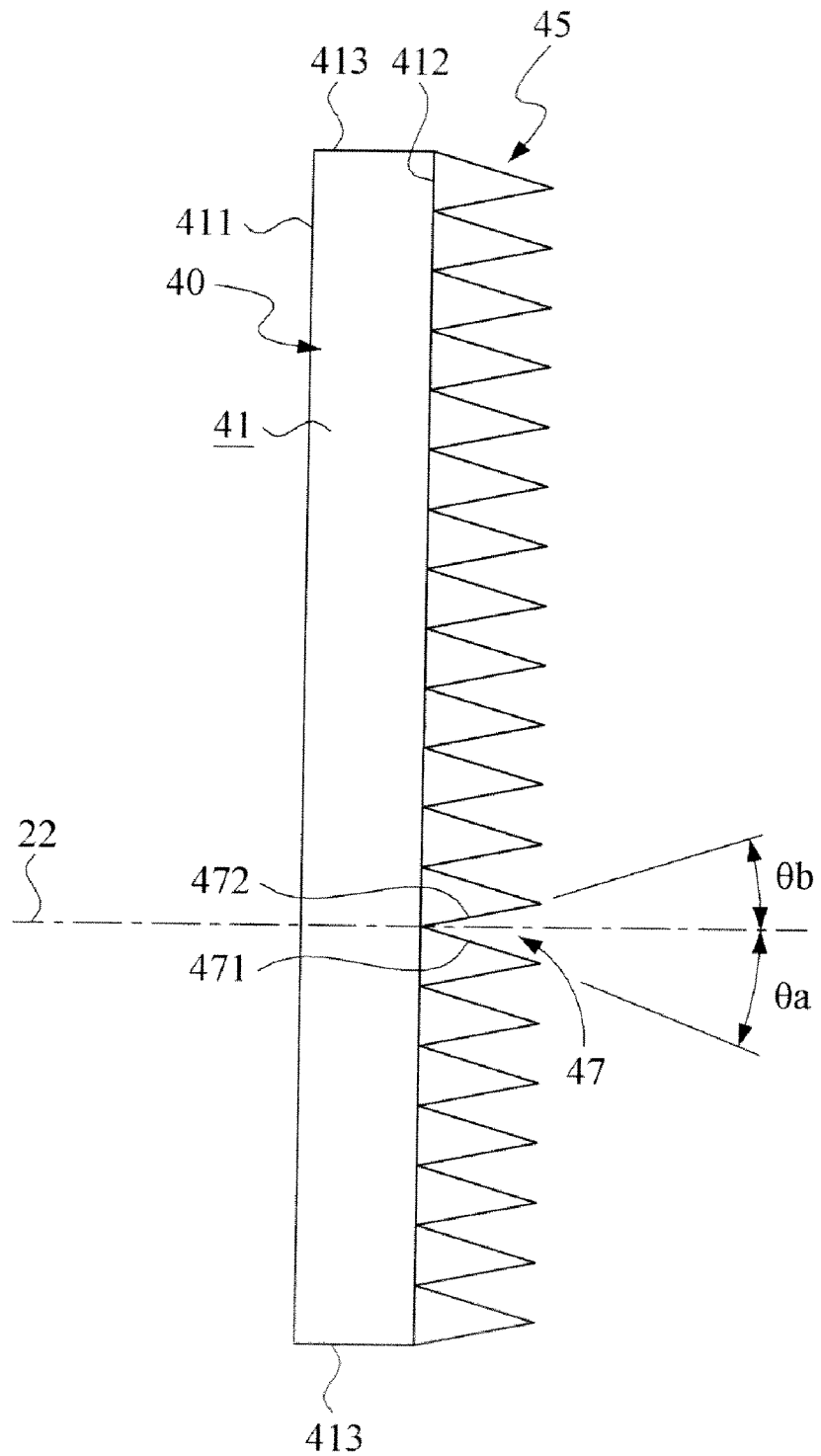
FIG. 4A shows a cross section of another embodiment of the light guiding film.
Figure 4B:
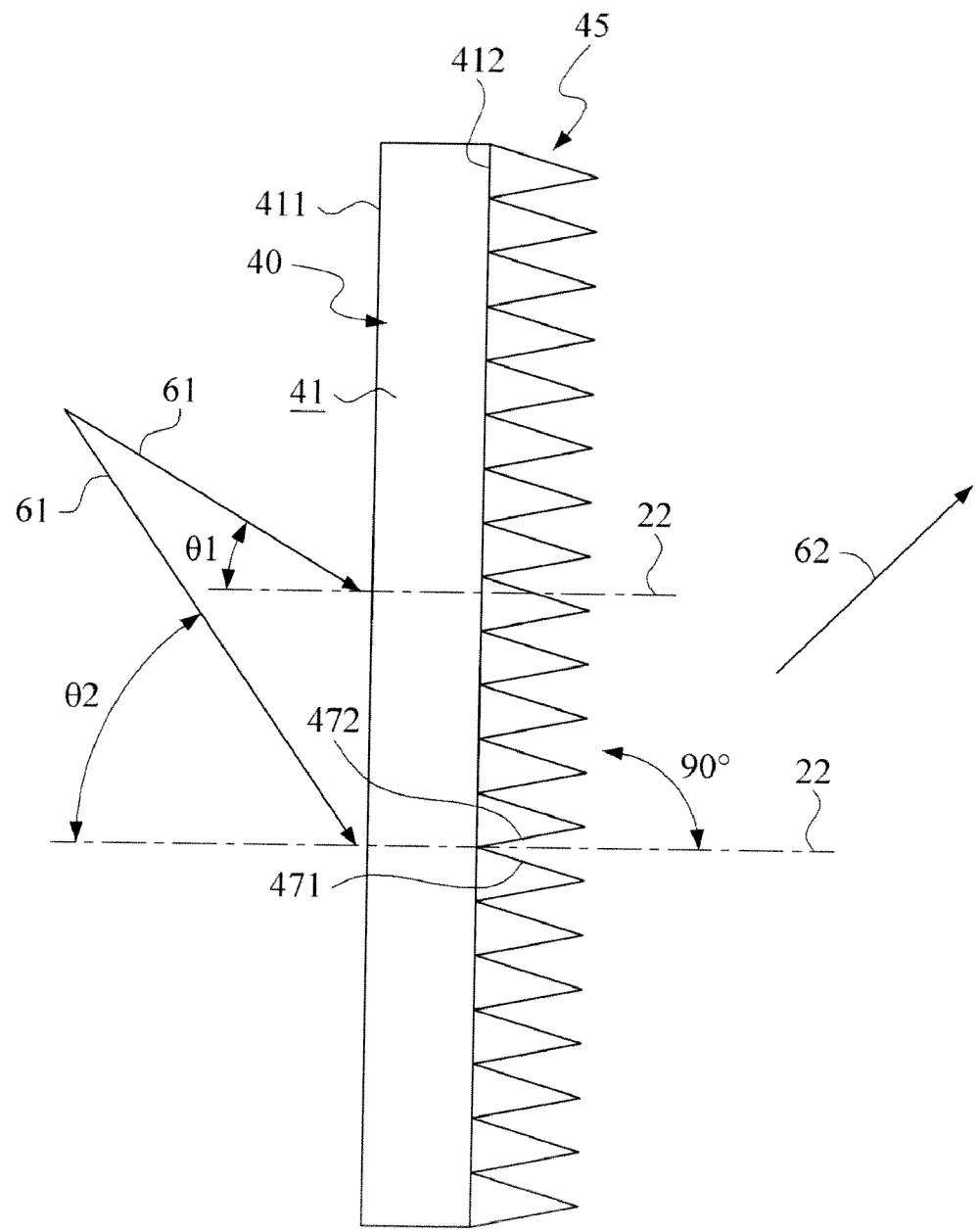
FIG. 4B shows the angle range of incident light beam and emissive light beam which respectively project in and out of the light guiding film.

Following up, another embodiment of the present invention is introduced. Referring to FIG. 4A and FIG. 4B, FIG. 4A shows a cross section of the other embodiment of the light guiding film 40, and FIG. 4B shows the angle range of incident light beam and emissive light beam which respectively project in and out of the light guiding film 40. The light guiding film 40 shown in FIG. 4A and FIG. 4B is similar to the light guiding film 20 shown in FIG. 2A and FIG. 2B in many terms of structure, function, forming, material . . . etc, so only the main differences between them would be described bellow.

In the above mentioned embodiments, the incident light beam projects to the light guiding film via the second side, while in the embodiment shown in FIG. 4A and FIG. 4B, the incident light beam projects to the light guiding film via the first side.

As shown in FIG. 4A and FIG. 4B, light guiding film 40 includes a film body 41 and a micro-structured portion 45. The film body 41 includes a first side 411, a second side 412 and two end portions 413 between the first side 411 and the second side 412. A reference horizontal level 22 is vertical to the second side 412. In this embodiment, the first side 411 is a light-incident side, and the second side 412 is a light-emissive side.

The micro-structured portion 45 is set on the second side 412 of the film body 41, and has a plurality of V-shaped grooves 47. Each one of the V-shaped grooves 47 has a first face 471 and a second face 472. The first face 471 is located lower the second face 472. The first face 471 and the second face 472 respectively have a first included angle θa and a second included angle θb with respect to the reference horizontal level 22. The first included angle θa is between 16° and 22°, and the second included angle θb is between 8° and 17°.

As shown in FIG. 4B, when the incident light beam 61 is downwardly projected to the film body 41 in a predetermined incident angle range θ1 and θ2, transmitted to the micro-structured portion 45 set on the second side 412, most of the incident light beam 61 is reflected by the second face 472 and transmitted through the first face 471 to emit the emissive light beam 62.

Moreover, 60% or more predetermined percentage of aforesaid incident light beam 61 is transmitted through the micro-structured portion 45 to emit the emissive light beam 62 when the predetermined incident angle range θ1 and θ2 is between 30° and 60°. In addition, the emissive light beam 62 has an included angle range between 0° and 90° with respect the reference horizontal level 22.

In the embodiment shown in FIG. 4A and FIG. 4B, preferably, the first included angle θa is 18° and the second included angle θb is 15°. Under these conditions, 50% or more predetermined percentage of aforesaid incident light beam 61 is transmitted through the micro-structured portion 45 to emit the emissive light beam 62.

Figure 4C:
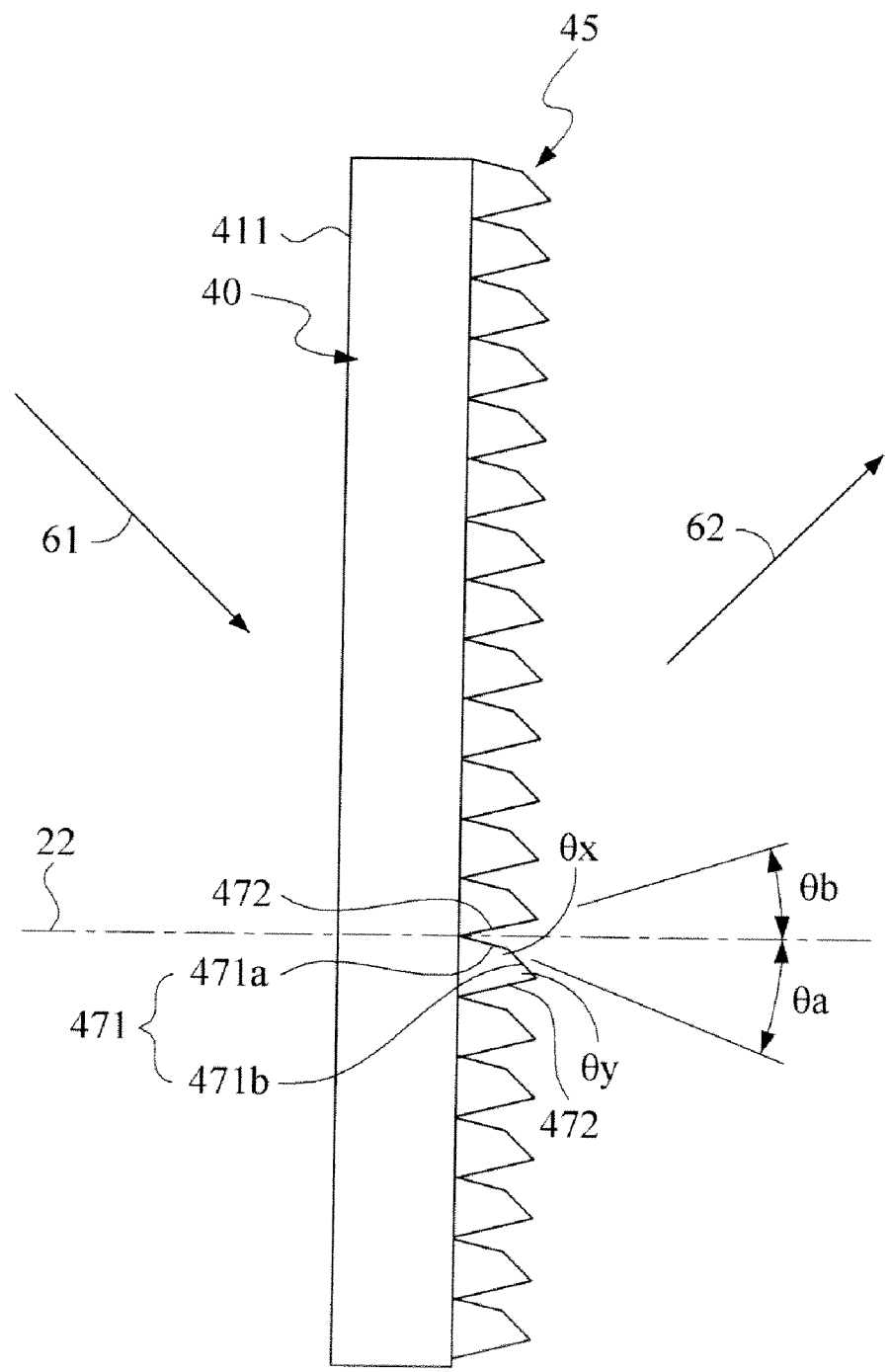
FIG. 4C shows another modification of the light guiding film.

Moreover, the V-shaped grooves 47 of the light guiding film 40 as shown in FIG. 4A, can further include two sub-grooves. As shown in FIG. 4C, the first face 471 includes a first sub-face 471a and a second sub-face 471b. The second sub-face 471b is seated between the first sub-face 471a and the second face 472. The second sub-face 471b has a third included angle θx between 140° and 150° with respect to the first sub-face 471a, and has a fourth included angle θy between 60° and 70° with respect to the second face 472. Furthermore, the third included angle θx is greater than the fourth included angle θy.

In the embodiment shown in FIG. 4C, preferably, the first included angle θa is 20°; the second included angle θb is 10°; the third included angle θx is 145°; and the fourth included angle θy is 65°. Under these conditions, 60% or more predetermined percentage of aforesaid incident light beam 61 is transmitted through the micro-structured portion 45 to emit aforesaid emissive light beam 62 with an included angle between 0° and 90° with respect to the reference horizontal level 22.

Figure 5A:
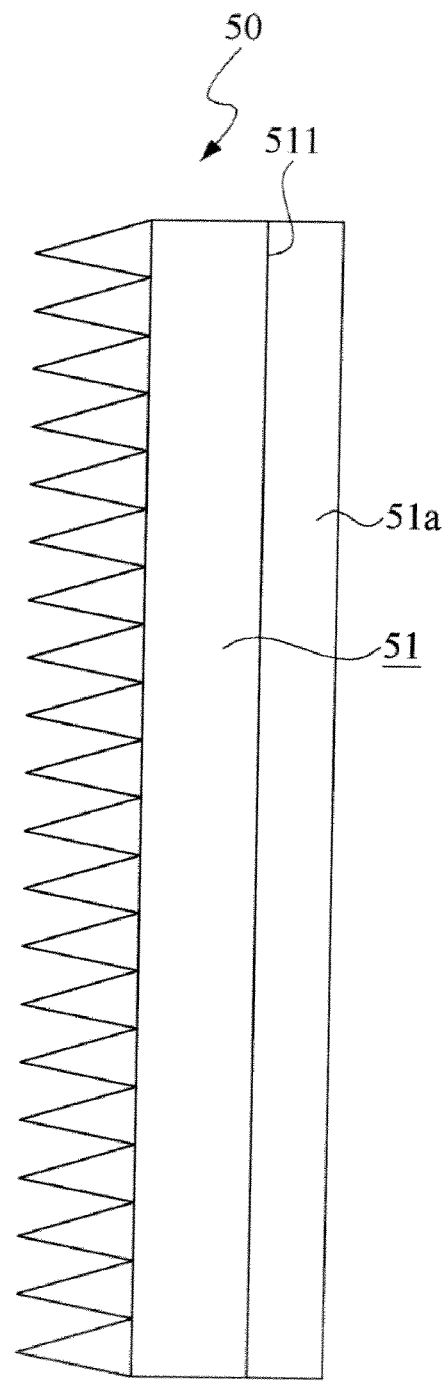
FIGS. 5A to 5C show the light guiding film mounted with at least one protecting film.
Figure 5B:
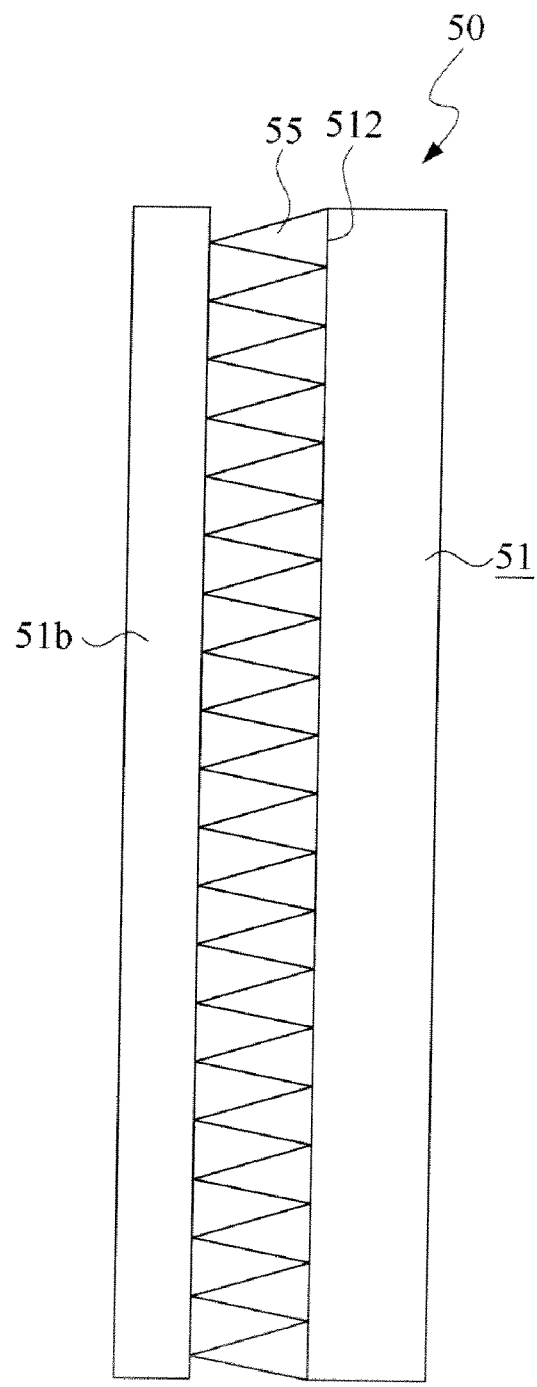
Figure 5C:
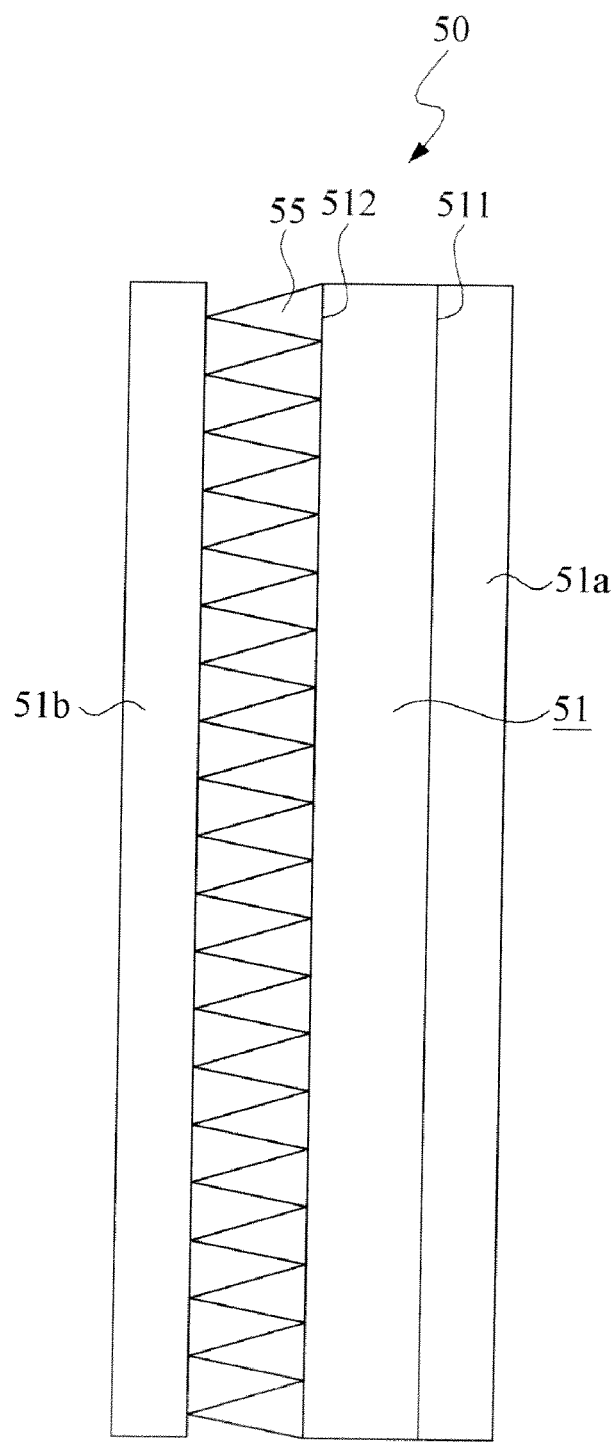

Please refer to FIGS. 5A to 5C which show the light guiding film 50 mounted with a protecting film. As shown in FIG.

5A, the light guiding film 50 further has a first protecting film 51a mounted on the first side 511. As shown in FIG. 5B, the light guiding film 50 further has a second protecting film 51b mounted on the micro-structured portion 55 of the second side 512.

More preferably, as shown in FIG. 5C, the light guiding film 50 further has a first protecting film 51a and a second protecting film 51b. The first protecting film 51a is mounted on the first side 511, and the second protecting film 51b is mounted on the micro-structured portion 55.

The material of aforesaid first protecting film 51a and second protecting film 51b can be made of light transmissible material, such like plastic, glass or be made of the material the same as the light guiding film 50. It is necessary to emphasize that the first protecting film 51a and second protecting film 51b can be either individually or collectively mounted on light guiding film 50.

Next, the preferably applications of the light guiding film would be introduced as follows. Nevertheless, the applications of the light guiding film are not limited thereto, which has the same design of angles and achieves the same effects of light direction tuning should be encompassed of the modifications of the present invention. Since the interpretation of the light guiding film is detailed, the manufacture, the material and the shape of fillet related to the light guiding film are abridged bellow.

Figure 6:
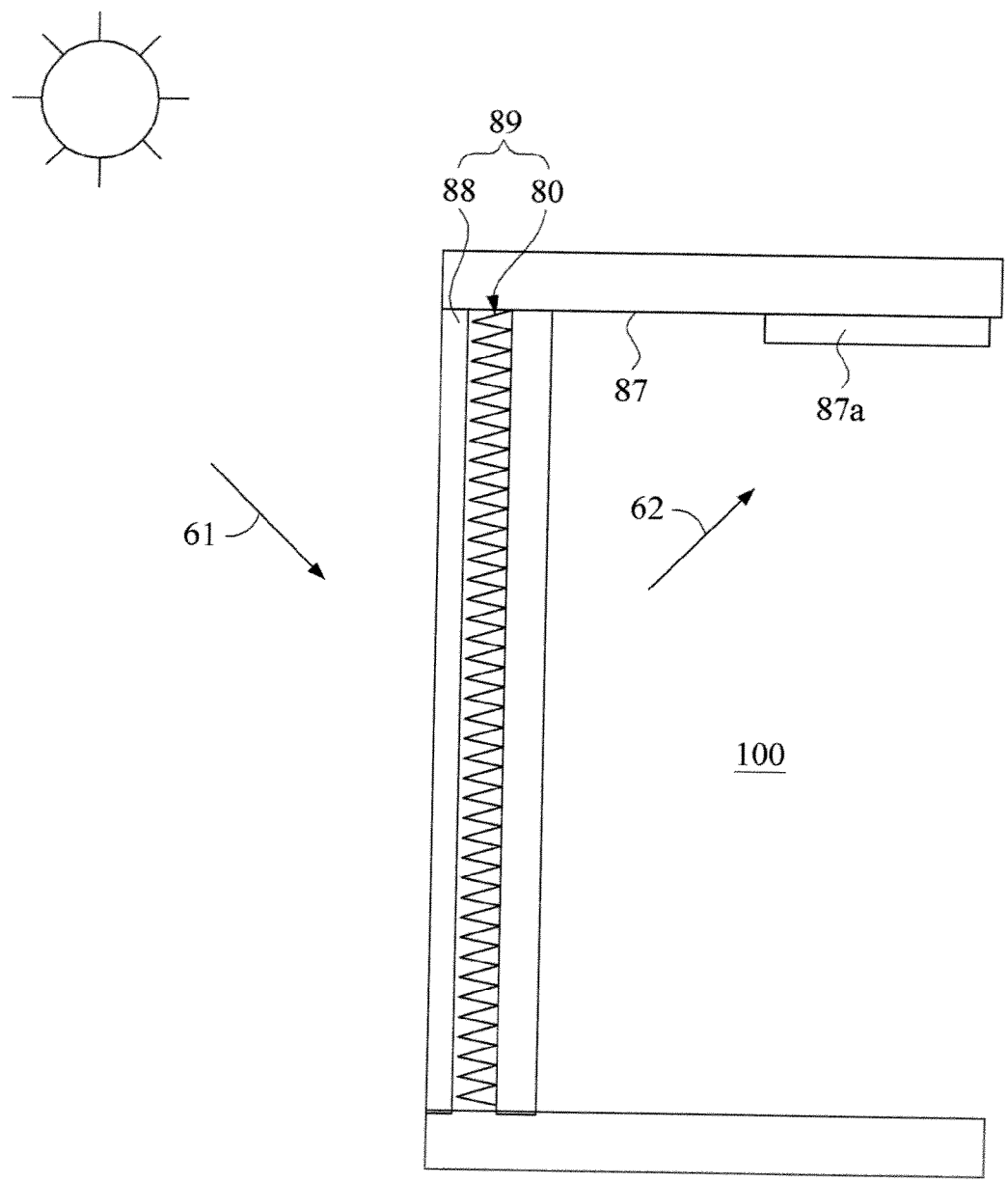
FIG. 6 shows that the light guiding film is applied to a window set to guide sunlight.

With reference to FIG. 6, the light guiding film 80 is applied to a window set 89 to guide sunlight. The window set 89 is set in the peripherally area of an indoor space 100, and has at least one light guiding film 80 mounted thereon. Preferably, in this embodiment, window set 89 further includes a light transmissible glass 88, which can be replaced by a light transmissible plastic for the light guiding film 80 being mounted thereon.

The incident light beam 61 can be sunlight projected from sun, and further projects to the window set 89, by which the incident light beam 61 can be guided to change its projecting direction. It is more preferable that the emissive light beam 62 can be guided to project to a light distribution device 87a located on a ceiling 87 of the indoor space 100, so as to make the emissive light beam 62 distributed over the indoor space 100. The light distribution device 87a can be a reflective film with a plurality of diffusing micro-structure thereon (not shown). It is more important that the light distribution device 87a hereinafter widely implies any device capable of diffusing or concentrating the emissive light beam 62 to any predetermined area within the indoor space.

Figure 6A:
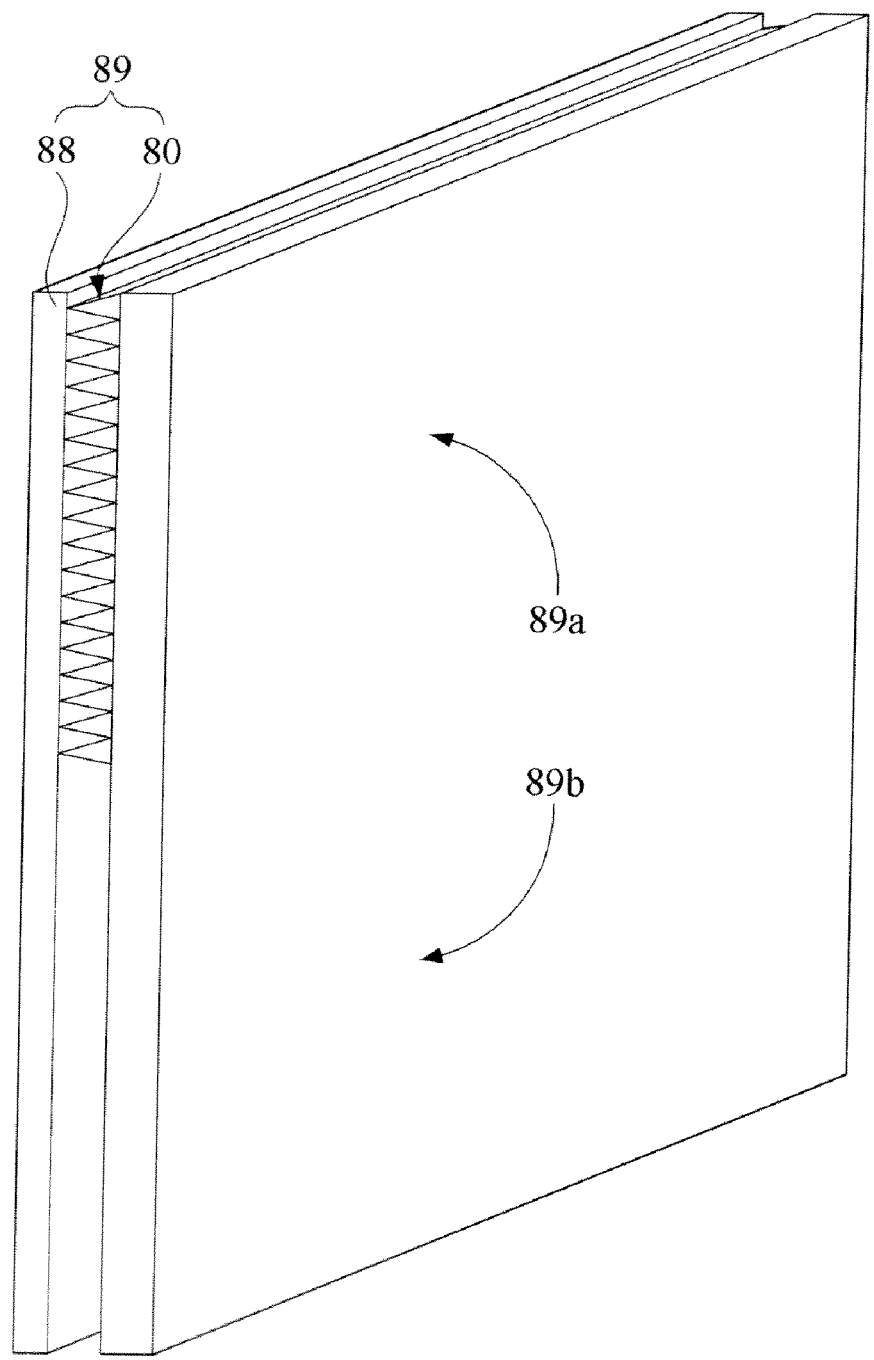
FIGS. 6A and 6B are perspective views of other modifications of the window set in accordance with FIG. 6.
Figure 6B:
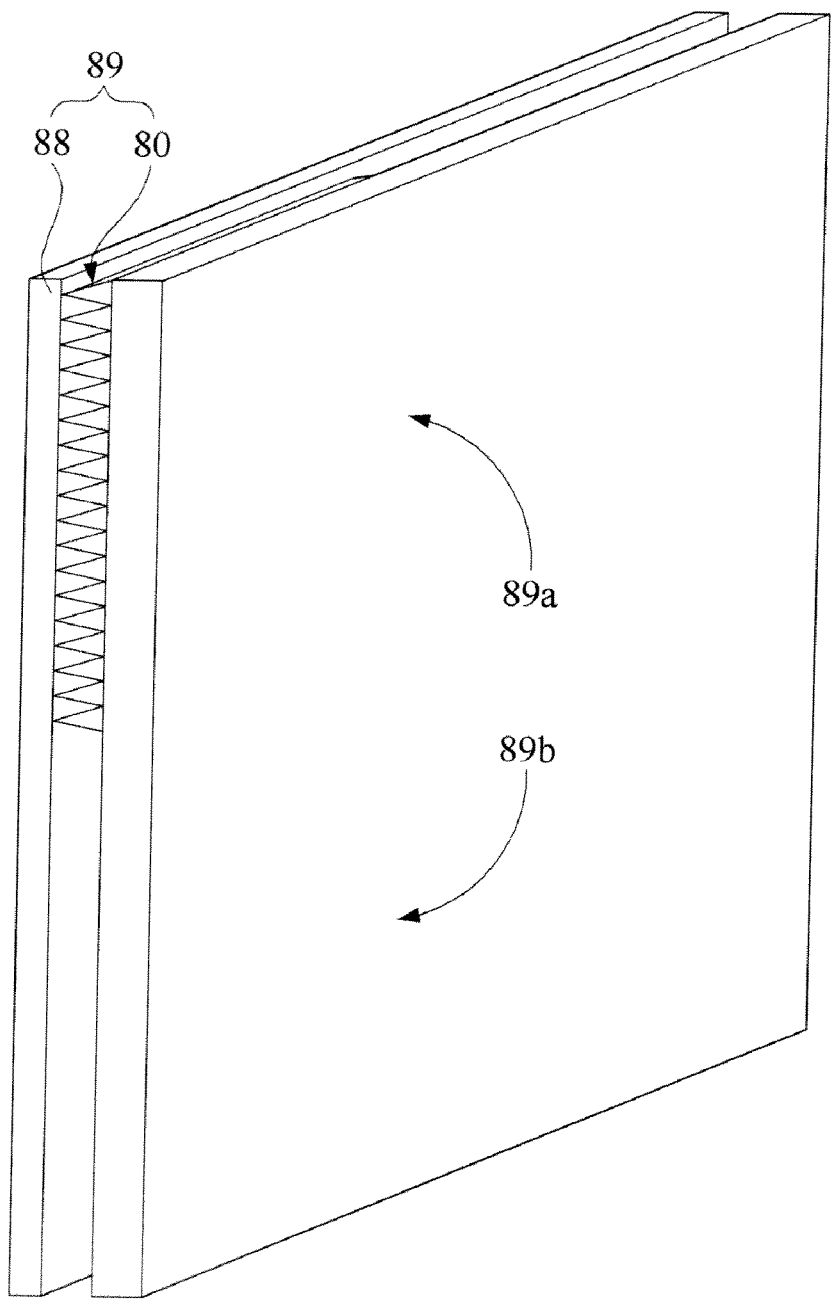

The window set 89 is further divided into an upper area and a lower area. As shown in FIG. 6A, the window set 89 includes an upper area 89a and a lower area 89b. The light guiding film 80 is mounted to fully cover the lower area 89b. As shown in FIG. 6B, the light guiding film 80 also can be mounted to partially cover the lower area 89b.

Figure 6C:
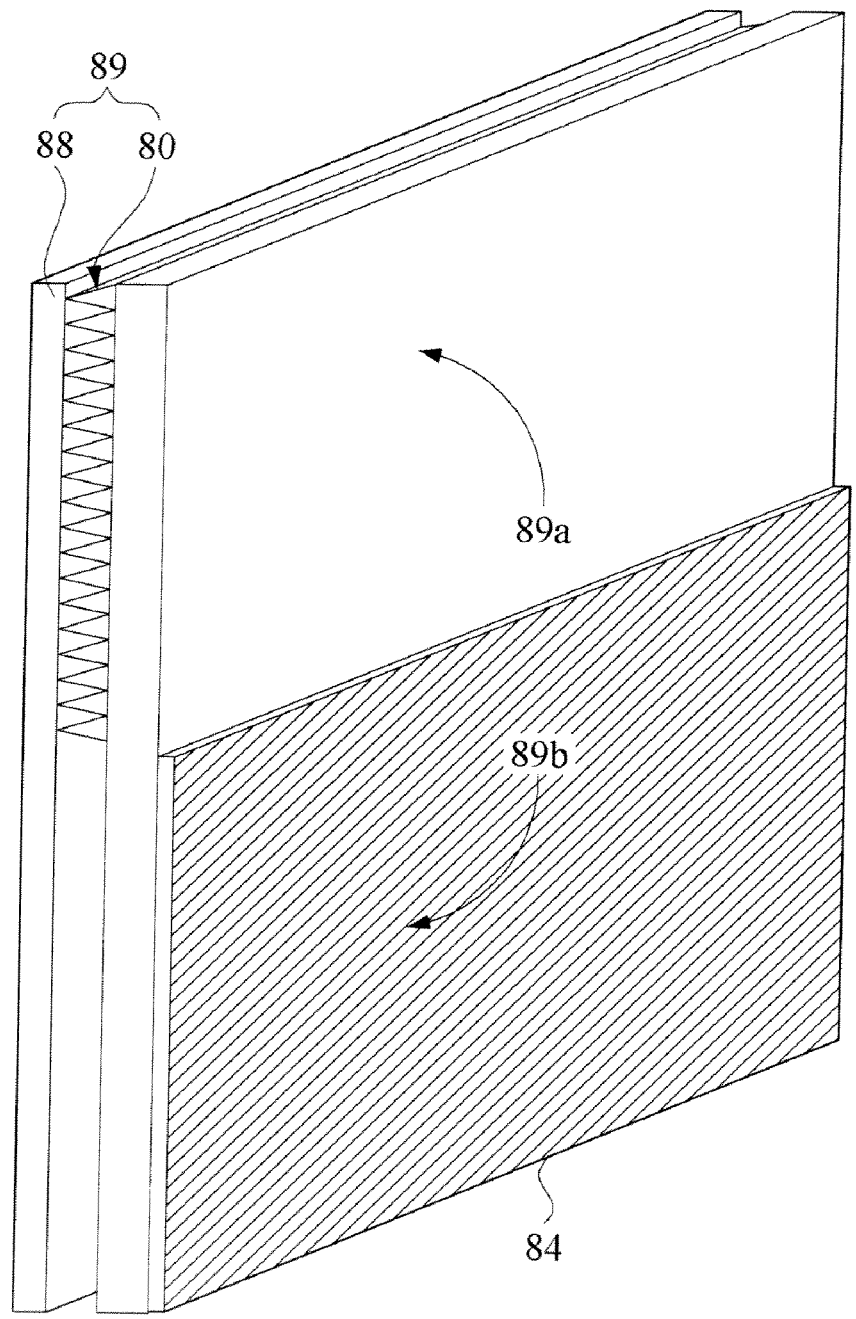
FIGS. 6C and 6D are perspective views of the window sets mounted with shading member.
Figure 6D:
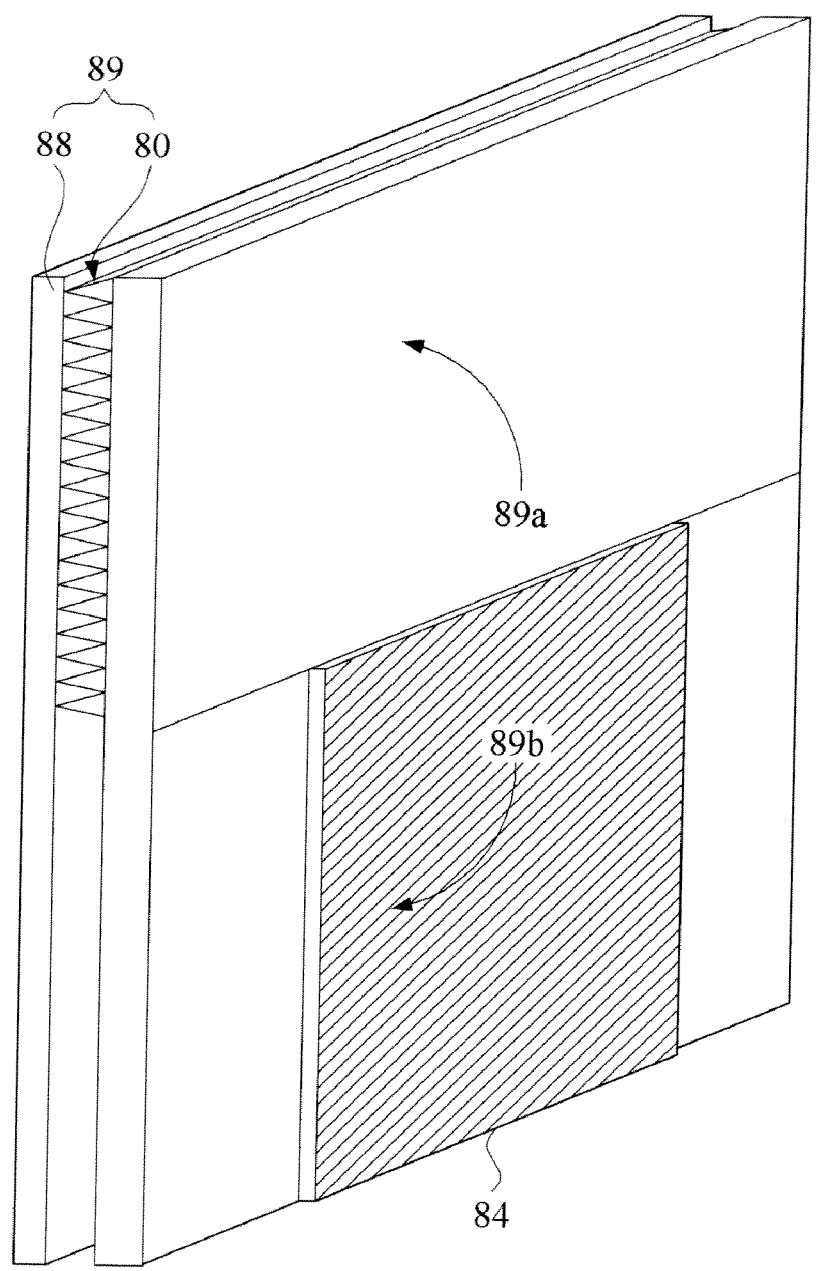

The window set 89 can further include a shading member 84 as shown in FIG. 6C. The shading member 84 is mounted on the lower area 89b to fully cover the lower area 89b. As shown in FIG. 6D, the shading member 84 also can be mounted to partially cover the lower area 89b. The shading member 84 could be an anti-dazzling screen or a curtain, but not limited to those examples as mentioned.

Figure 6E:
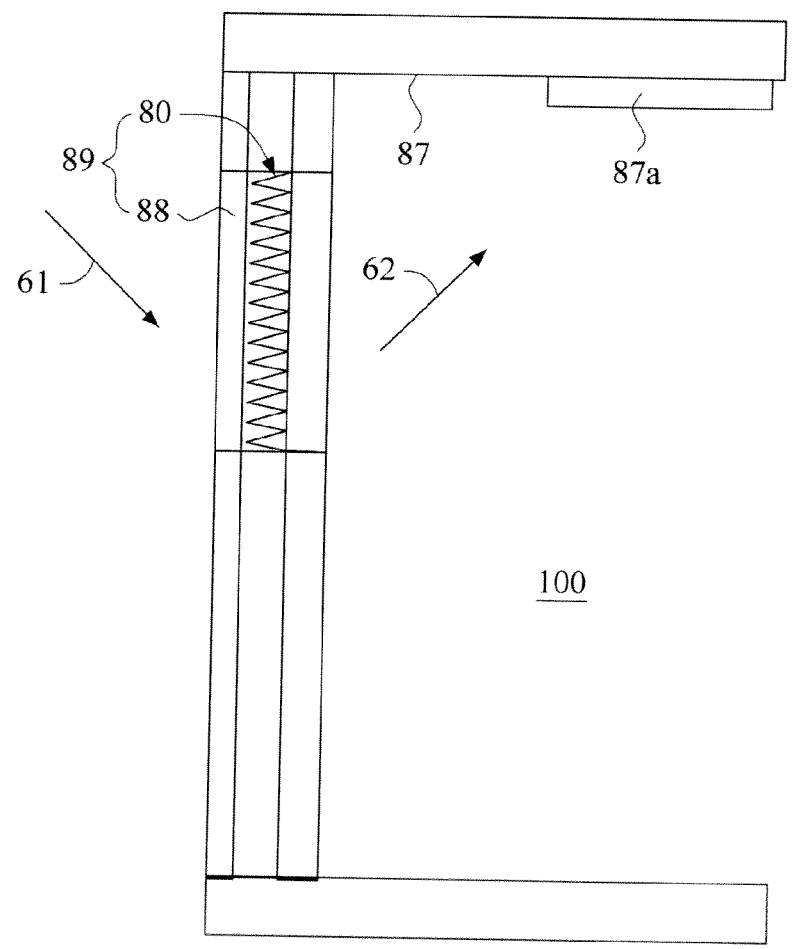
FIG. 6E is a perspective views of another modification of window set.

The light guiding film 80 in accordance with the present invention can be mounted on the light transmissible glass 88, which can be replaced by light transmissible plastic, or the light guiding film 80 can be mounted on the holder near the window set (not shown). In additional, the window set 89 also can be provided in a window-type shown in FIG. 6E.

Figure 7:
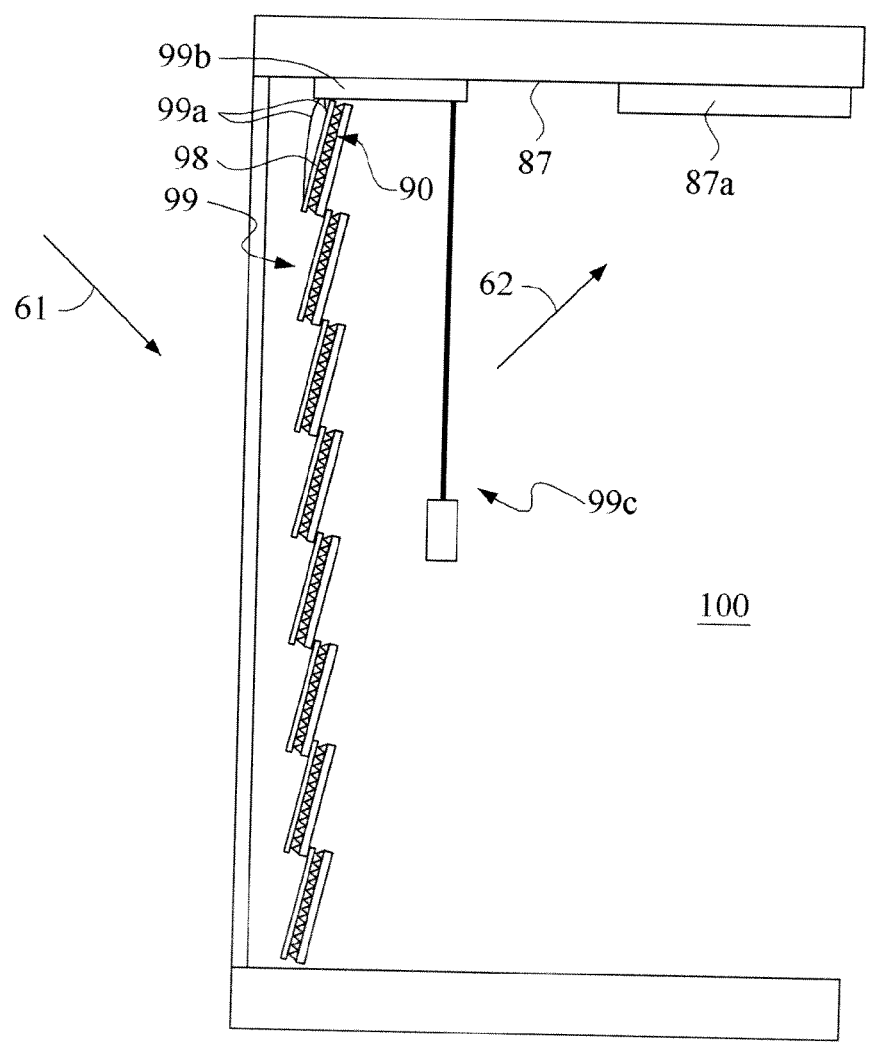
FIG. 7 shows that the light guiding film is applied to a blind to guide sunlight.
Figure 7A:
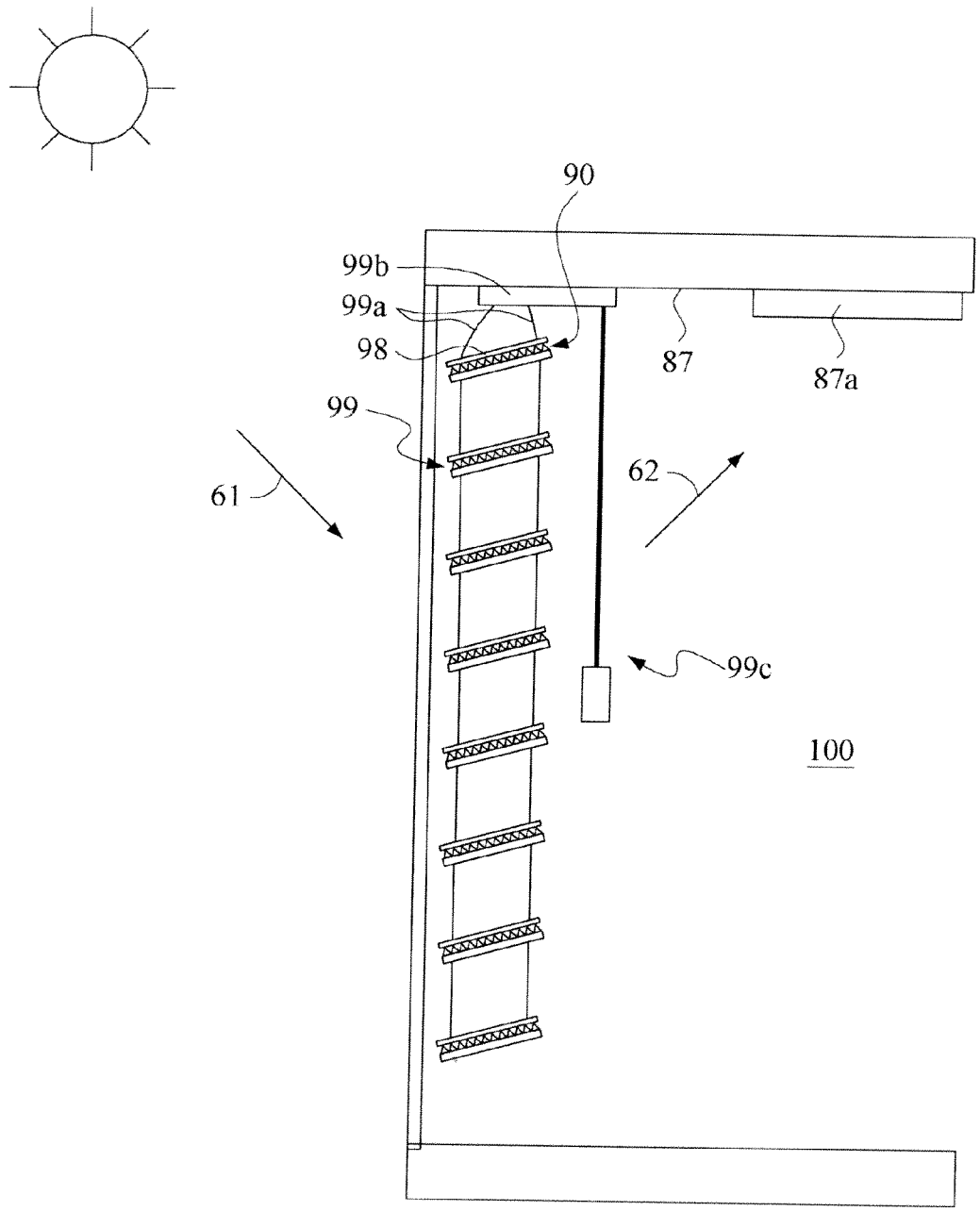
FIG. 7A shows that the blind shown in FIG. 7 is operated in an inclining situation.

Referring to FIGS. 7 and 7A, FIG. 7 shows the light guiding film is applied to a blind 99 to guide sunlight, FIG. 7A that the blind 99 shown in FIG. 7 is operated in an inclining situation. The blind 99 is set in the peripheral of an indoor space 100, and has a plurality of light guiding films 90. Preferably, in this embodiment, the blind 99 further includes a plurality of light transmissible glass slats 98, which also can be replaced by a plurality of light transmissible plastic slats, and the light transmissible glass slats 98 can be respectively mounted on the light guiding films 90.

The incident light beam 61 can be sunlight projected from sun, and further projects to the blind 99, by which the incident light beam 61 can be guided to change its projecting direction. It is more preferable that the emissive light beam 62 can be guided to project to the light distribution device 87a located on the ceiling 87 of the indoor space 100, so as to make the emissive light beam 62 distributed over the indoor space 100. The blind 99 further includes a top track (not shown), at least one first transmission device 99a, a second transmission device 99b and an operation device 99c. The top track is applied for the light guiding film being set thereunder. The first transmission device 99a is connected to and is cooperated with the light guiding film 90 to control the light guiding film 90 inclined in a predetermined range. The second transmission device 99b is connected to and is cooperated with the first transmission device 99a. Meanwhile, the operation device 99c is connected to and is cooperated with the second transmission device 99b. When the operation device 99c is operated, the second transmission device 99b drives the first transmission device, so as to make the light guiding film 90 inclined in the predetermined range.

By the way, the light guiding film 80 mounted on the blind 99 can be set in many types, such like fully or partially set on the upper area 89a of the window set 89. Meanwhile, the light guiding film 80 can be mounted to fully or partially cover the lower area 89b. Moreover, the blind 99 can be applied to French windows or general windows.

Particularly, the blind in prior art has various modifications such as ladder-vertically lifting type, ladder-horizontally lifting type . . . etc. All the blinds mounted with the light guiding film provided in accordance with the present invention and having the function of guiding sunlight, should be viewed as the blind as claimed the present invention.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A light guiding film, comprising:
   a film body comprising a first side and a second side, and having a reference horizontal level vertical to said second side; and
   a micro-structured portion arranged on said second side and having a plurality of V-shaped grooves, and at least one of said V-shaped grooves including:
      a first face having a first included angle between 16° and 22° with respect to said reference horizontal level; and
      a second face having a second included angle between 8° and 17° with respect to said reference horizontal level;
   wherein when an incident light beam injects downwardly on said micro-structured portion in a predetermined incident angle range, a predetermined percentage of said incident light beam transmits said light guiding film to upwardly emit an emissive light beam with an included angle range between 0° and 90° with respect to said reference horizontal level.

2. The light guiding film according to claim 1, wherein said predetermined incident angle range is between 30° and 60°.

3. The light guiding film according to claim 1, wherein said first included angle is 18°.

4. The light guiding film according to claim 1, wherein said second included angle is 15°.

5. The light guiding film according to claim 1, further comprising a fillet between said first face and said second face.

6. The light guiding film according to claim 1, wherein said first face further includes a first sub-face and a second sub-face, and wherein said second sub-face is seated between said first sub-face and said second face.

7. The light guiding film according to claim 6, wherein said second sub-face has a third included angle with respect to said first sub-face, said second sub-face has a fourth included angle with respect to said second face, and said third included angle is greater than said fourth included angle.

8. The light guiding film according to claim 7, wherein said third included angle is between 140° and 150°.

9. The light guiding film according to claim 7, wherein said fourth included angle is between 60° and 70°.

10. The light guiding film according to claim 7, wherein said first included angle is 20°.

11. The light guiding film according to claim 7, wherein said second included angle is 10°.

12. The light guiding film according to claim 1, wherein said light guiding film is made of a material with a refractive index ranging from 1.35 to 1.65.

13. The light guiding film according to claim 1, wherein said light guiding film is made of a material with a light transmittance ranging from 0.75 to 0.95.

14. The light guiding film according to claim 1, wherein said film body and said micro-structured portion are integrally formed.

15. The light guiding film according to claim 1, wherein said incident light beam injects on said second side.

16. The light guiding film according to claim 1, wherein said incident light beam injects on said first side of said film body, and wherein said first face is lower said second face.

17. The light guiding film according to claim 1, wherein said predetermined percentage ranges from 50% to 80%.

18. The light guiding film according to claim 1, which is used in a window set.

19. The light guiding film according to claim 18, wherein said window set has a light transmissible glass, wherein said light guiding film is adjacent to said light transmissible glass.

20. The light guiding film according to claim 19, wherein a shading member is adjacent to said lower area.

21. The light guiding film according to claim 18, wherein said window set further includes an upper area and a lower area, and said light guiding film is adjacent to said upper area.

22. The light guiding film according to claim 21, wherein said shading member is one of an anti-dazzling screen and a curtain.

23. The light guiding film according to claim 1, further comprising a first protecting film adjacent to said first side.

24. The light guiding film according to claim 1, further comprising a second protecting film adjacent to said micro-structured portion.

25. The light guiding film according to claim 1, being applied to at least one blind being set in a peripheral area of an indoor space to guide said incident light beam, which is a beam of sunlight downwardly projected from sun, to be upwardly projected out to emit said emissive light beam after passing through the said blind, hereafter, said emissive light beam is projected to a light distribution device located on a ceiling and distributed over said indoor space.

26. The light guiding film according to claim 25, wherein said blind further comprises:
a top track for said light guiding film being set thereunder;
a first transmission device set on said top track and connected to and cooperated with said light guiding film to control said light guiding film inclined in a predetermined angle range;
a second transmission device set on said top track, connected to and cooperated with said first transmission device; and
an operation device connected to and cooperated with said second transmission device;
wherein said operation device is operated to make said second transmission device drive said first transmission device, so as to make said light guiding film inclined in said predetermined angle range.

27. A light guiding film being applied to at least one window set being set in an peripheral area of an indoor space to guide said incident light beam, which is a beam of sunlight downwardly projected from sun, to be upwardly projected out to emit said emissive light beam after passing through the said window set, hereafter, said emissive light beam is projected to a light distribution device located on a ceiling and distributed over said indoor space, and said light guiding film comprising:
a film body, comprising a first side and a second side, and having a reference horizontal level vertical to said second side; and
a micro-structured portion arranged on said second side and having a plurality of V-shaped grooves, and at least one of said V-shaped grooves including:
a first face having a first included angle between 16° and 22° with respect to said reference horizontal level; and
a second face having a second included angle between 8° and 17° with respect to said reference horizontal level;
wherein the predetermined incident angle range is between 30° and 60°, and when an incident light beam injects downwardly on said micro-structured portion in a predetermined incident angle range, a predetermined percentage of said incident light beam transmits said light guiding film to upwardly emit an emissive light beam with an included angle range between 0° and 90° with respect to said reference horizontal level.

28. A light guiding film, being applied to at least one blind being set in a peripheral area of an indoor space to guide said incident light beam, which is a beam of sunlight downwardly projected from sun, to be upwardly projected out to emit said emissive light beam after passing through the said blind, hereafter, said emissive light beam is projected to a light distribution device located on a ceiling and distributed over said indoor space, and said light guiding film comprising:
a film body comprising a first side and a second side, and having a reference horizontal level vertical to said second side; and
a micro-structured portion arranged on said second side and having a plurality of V-shaped grooves, and at least one of said V-shaped grooves including:
a first face having a first included angle between 16° and 22° with respect to said reference horizontal level; and
a second face having a second included angle between 8° and 17° with respect to said reference horizontal level;
wherein the predetermined incident angle range is between 30° and 60°, and when an incident light beam injects downwardly on said micro-structured portion in a predetermined incident angle range, a predetermined percentage of said incident light beam transmits said light guiding film to upwardly emit an emissive light beam with an included angle range between 0° and 90° with respect to said reference horizontal level.

* * * * *